(12) United States Patent
Ries-Mueller

(10) Patent No.: US 6,862,878 B2
(45) Date of Patent: Mar. 8, 2005

(54) METHOD AND DEVICE FOR OPERATING AN INTERNAL COMBUSTION ENGINE

(75) Inventor: Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/755,010

(22) Filed: Jan. 8, 2004

(65) Prior Publication Data

US 2004/0187853 A1 Sep. 30, 2004

(30) Foreign Application Priority Data

Jan. 10, 2003 (DE) .......................................... 103 00 593

(51) Int. Cl.$^7$ ........................... F01N 3/20; G01M 15/00
(52) U.S. Cl. ............................ 60/277; 60/324; 60/288; 73/118.1
(58) Field of Search ....................... 123/568.16; 60/274, 60/277–279, 287, 288, 311, 324, 600, 602, 605.1, 605.2; 73/117.3, 118.1

(56) References Cited

U.S. PATENT DOCUMENTS

| | | | | |
|---|---|---|---|---|
| 5,375,416 A | * | 12/1994 | Iwata et al. ................... | 60/277 |
| 5,557,933 A | * | 9/1996 | Numata et al. ................ | 60/277 |
| 5,560,199 A | * | 10/1996 | Agustin et al. ................ | 60/277 |
| 5,806,306 A | * | 9/1998 | Okamoto et al. .............. | 60/277 |
| 5,916,130 A | * | 6/1999 | Nakae et al. .................. | 60/277 |
| 6,401,451 B1 | * | 6/2002 | Yasui et al. ................... | 60/277 |
| 6,687,601 B2 | * | 2/2004 | Bale et al. ..................... | 60/324 |

* cited by examiner

Primary Examiner—Willis R. Wolfe, Jr.
(74) Attorney, Agent, or Firm—Kenyon & Kenyon

(57) ABSTRACT

A method and a device for operating an internal combustion engine, in particular of a motor vehicle, which allow detecting a function of at least one actuating element in an exhaust branch without an additional sensory system. The internal combustion engine includes exhaust-gas recirculation via which exhaust gas is conveyed from the exhaust branch to an intake manifold in an activated state. The internal combustion engine includes at least one actuating element in the exhaust branch. In at least one operating state of the internal combustion engine, given activated exhaust-gas recirculation, a first intake-manifold pressure is ascertained in a first position of the at least one actuating element in the exhaust branch, and a second intake-manifold pressure in a second position of the at least one actuating element in the exhaust branch. The function of the at least one actuating element in the exhaust branch is monitored as a function of a difference between the first and the second intake-manifold pressures.

6 Claims, 4 Drawing Sheets

# METHOD AND DEVICE FOR OPERATING AN INTERNAL COMBUSTION ENGINE

BACKGROUND INFORMATION

Future internal combustion engines of motor vehicles, operating on the basis of jet-directed combustion methods, for example, have lower waste-heat losses due to better engine efficiency. In particular following a cold start, the engine heat is then often insufficient to heat up the passenger cabin. For this reason, the introduction of heat exchangers is taken into consideration, in which the exhaust gas of the engine heats the cooling water of the motor vehicle. In a warm engine, the heat exchanger is circumvented via a bypass with the aid of an actuating element in the exhaust branch.

A similar actuating element in the exhaust branch may also be useful for bypassing a NOx catalytic converter. In higher engine loads, in homogeneous operation, the exhaust gas will then not be conveyed via the NOx catalytic converter, but also via a bypass. This leads to lower thermal stress of the NOx catalytic converter, among others, and to a higher engine output due to the lower exhaust-gas counterpressure.

For reasons of emission and safety, the function of such actuating elements in the exhaust branch must be monitored. Monitoring may occur, for example, by a temperature sensor in the flow direction, downstream from the corresponding actuating element in the exhaust branch. Furthermore, it is conceivable to measure the position of the actuating element with the aid of a potentiometer. For this reason, a diagnosis of the function of the appropriate actuating element in the exhaust branch requires an additional sensor system.

Furthermore, internal combustion engines are known that include exhaust-gas recirculation via which exhaust gas from an exhaust branch is conveyed to an intake manifold of the internal combustion engine in an activated state.

SUMMARY OF THE INVENTION

The method according to the present invention and the device according to the present invention have the advantage over the related art that in at least one operating state of the internal combustion engine, at activated exhaust-gas recirculation, a first intake-manifold pressure in a first position of the at least one actuating element in the exhaust branch is ascertained, and a second intake-manifold pressure in a second position of the at least one actuating element in the exhaust branch is determined and the function of the at least one actuating element in the exhaust branch is monitored as a function of a difference between the first and the second intake-manifold pressure. In this way, it is possible to realize the diagnosis of the at least one actuating element in the exhaust branch without an additional sensory system. Alternatively, it is possible in this way to realize a redundant diagnosis of the at least one actuating element in the exhaust branch, in addition to the evaluation of a sensory system provided specifically for detecting the position of the actuating element in the exhaust branch.

It is particularly advantageous if a malfunction of the at least one actuating element in the exhaust branch is detected when the amount of the difference between the first and the second intake-manifold pressures falls below a predefined threshold value. In this manner, the diagnosis of the function of the at least one actuating element in the exhaust branch may be realized in a particularly simple and low-cost, but simultaneously reliable manner.

An additional advantage results when the predefined threshold value is selected as a function of a speed of rotation of the internal combustion engine. In this manner, the diagnosis of the at least one actuating element in the exhaust branch is implementable at different speeds of rotation of the internal combustion engine.

An additional advantage results when the monitoring of the function of the at least one actuating element is implemented when the internal combustion engine is operated in overrun. In this way, a defined operating state of the internal combustion engines with few interference effects is present, which allows an especially reliable diagnosis of the function of the at least one actuating element in the exhaust branch.

In the monitoring of a plurality of actuating elements in the exhaust branch, an additional advantage results if the function of one of the actuating elements is monitored and the position of the other actuating element(s) is kept constant. This makes it possible to monitor each individual actuating element in an inexpensive manner even if a plurality of actuating elements is present in the exhaust branch.

DETAILED DESCRIPTION

Figure 1:
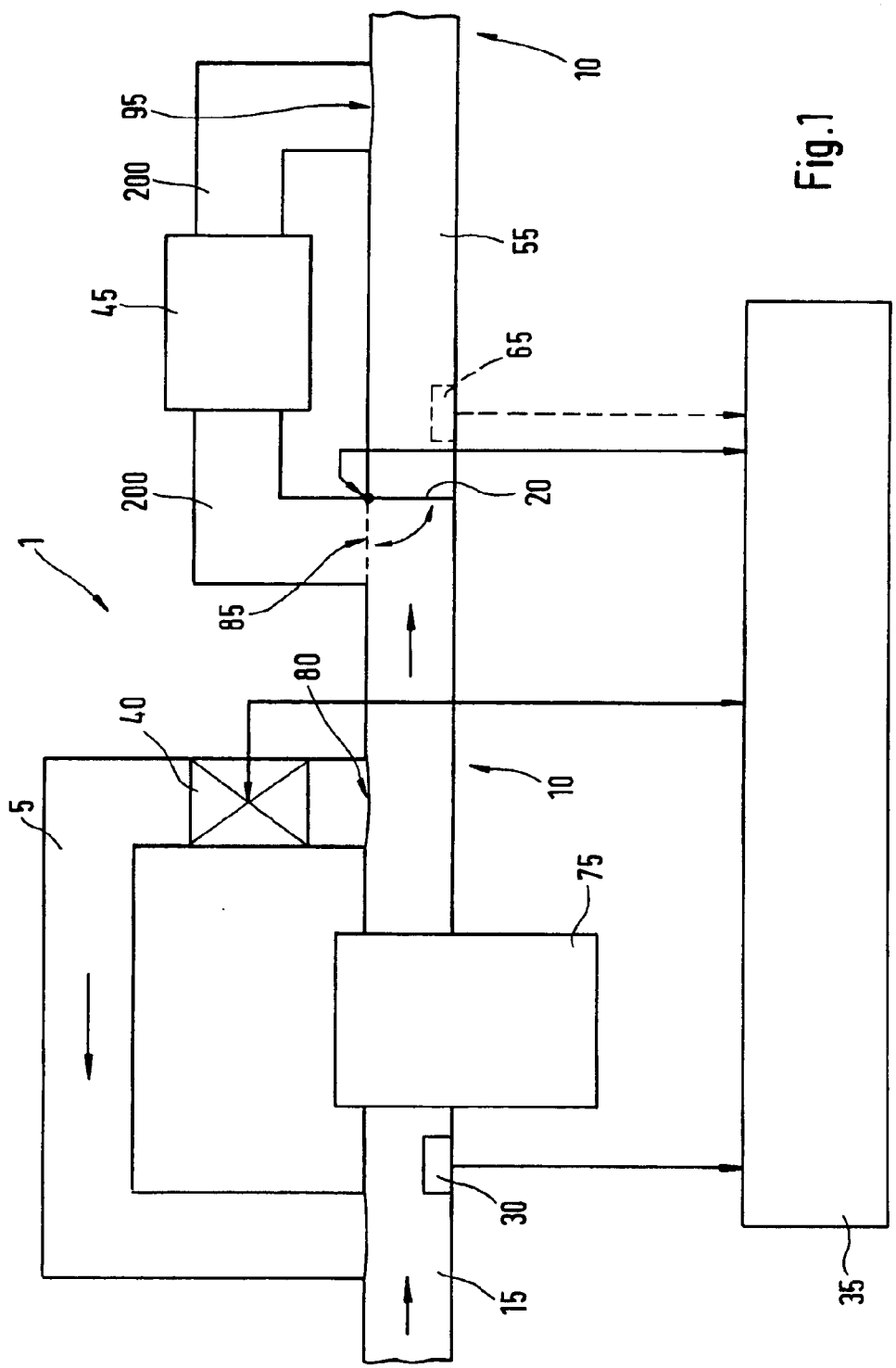
FIG. 1 shows a schematic view of an internal combustion engine configured according to a first specific embodiment.

In FIG. 1, reference numeral 1 designates an internal combustion engine of a motor vehicle, for example. Internal combustion engine 1 includes a combustion engine 75, which may be embodied as spark-ignition engine or as diesel engine, for instance. Combustion engine 75 is supplied with fresh air via an intake manifold 15. The fuel injection may be implemented either into intake manifold 15 or directly into a combustion chamber of combustion engine 75 and is not shown in FIG. 1 for reasons of clarity. The exhaust gas formed in the combustion chamber of combustion engine 75 in the combustion of the air/fuel mixture is expelled into an exhaust branch 10. In addition, exhaust-gas recirculation 5 is provided, which connects exhaust branch 10 with intake manifold 15 and includes an exhaust-gas recirculation valve 40. In the following, exhaust-gas recirculation 5 is also referred to as exhaust-gas recirculation channel. Via exhaust-gas recirculation valve 40, it is possible to vary the exhaust-gas mass flow, which flows from exhaust branch 10 into intake manifold 15 via exhaust-gas recirculation channel 5. If exhaust-gas recirculation valve 40 is closed, no exhaust-gas recirculation takes place. In this case, the exhaust-gas recirculation is not activated. If exhaust-gas recirculation valve 40 is open, however, the exhaust-gas recirculation is activated, the magnitude of the exhaust-gas mass flow depending on the extent to which exhaust-gas recirculation valve 40 is opened. In FIG. 1, the flow direction of the supplied fresh air is indicated by an arrow in intake manifold 15. In exhaust branch 10, the flow direction of the exhaust gas is marked by an arrow. Furthermore, an arrow in exhaust-gas recirculation channel 5 marks the direction in which the recirculated exhaust gas flows.

Disposed in the flow direction downstream from a first branch 80 of exhaust-gas recirculation channel 5 in exhaust branch 10 is a second branch 85 via which the exhaust gas is conveyed to a first pressure resistor 45. In the following, it is to be assumed by way of example that the first pressure resistor is a heat exchanger. The exhaust gas conveyed via heat exchanger 45 is returned again to exhaust branch 10 at a first return branch 95. Heat exchanger 45 is used to warm the passenger cabin of the motor vehicle by extracting heat from the exhaust gas. Heat exchanger 45 may be bypassed via a first bypass 55 in exhaust branch 10. For this purpose, a first actuating element 20 is provided, which, in a first position, which is shown in FIG. 1 as a dotted line, is able to block the exhaust gas from reaching heat exchanger 45, and, in a second position, which is shown in FIG. 1 by a solid line, is able to block bypass 55 to the exhaust gas. First actuating element 20 is switchable between these two positions.

According to FIG. 1, an intake-manifold pressure sensor 30, which constitutes a detection means, is provided as well; it measures the intake-manifold pressure in intake manifold 15 and transmits it to a monitoring means 35. By way of example it is to be assumed in the following that monitoring means 35 is an engine control unit of internal combustion engine 1. Engine control unit 35 also controls the opening degree of exhaust-gas recirculation valve 40. Furthermore, engine control unit 35 controls the adjustment of first actuating element 20 into its first position or into its second position. It may optionally be provided that a measuring means, such as a potentiometer (not shown in FIG. 1), is included, which detects the setting, i.e., the position, of first actuating element 20 and transmits it to engine control unit 35. As an option, it may likewise be provided that a first temperature sensor 65 is disposed in first bypass 55, downstream from first actuating element 20 in exhaust branch 10 in the flow direction, which measures the temperature in first bypass 55 and transmits it to engine-control unit 35. In FIG. 1, first temperature sensor 65 is shown as a dotted line. As an alternative, it could also be situated together with heat exchanger 45 in a first branch line, denoted by reference numeral 200 in FIG. 1, in the region of second branch 85. First branch line 200 is returned again to exhaust branch 10 via first return branch 95.

Figure 2:
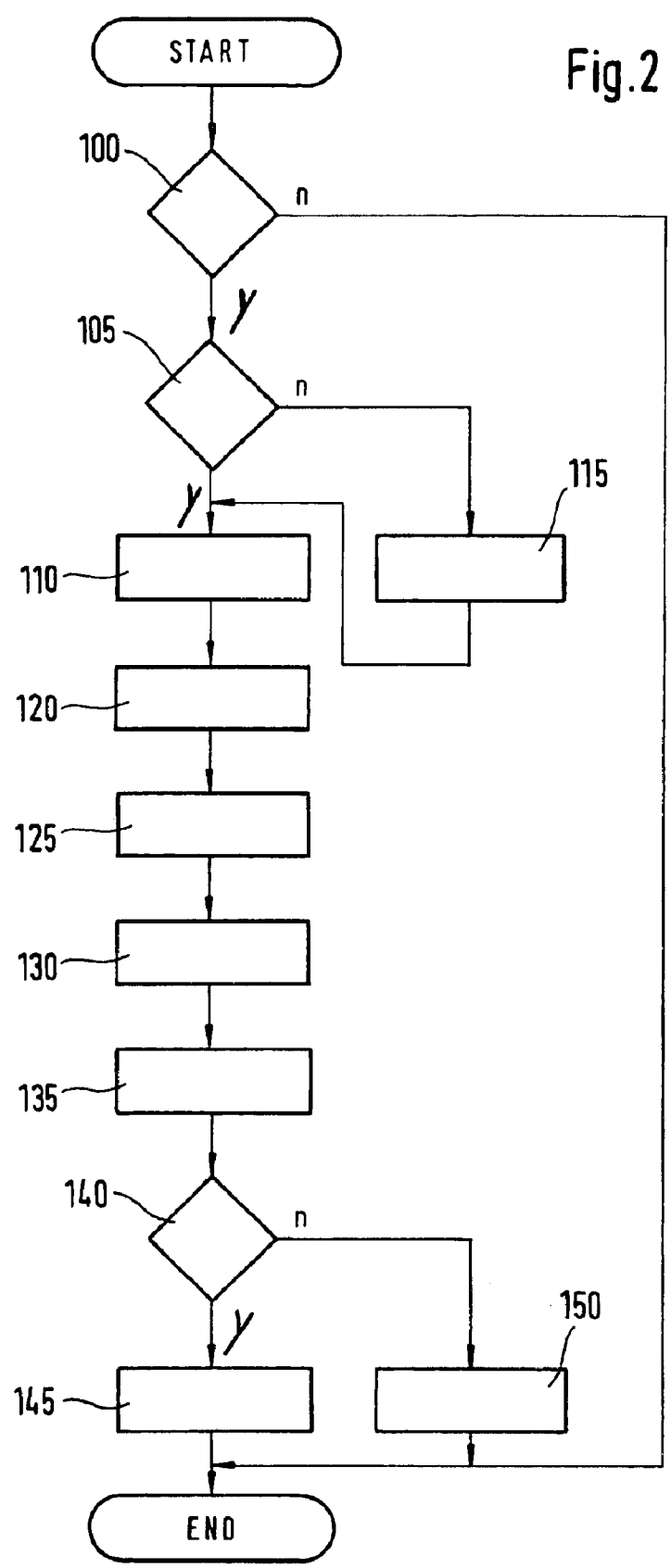
FIG. 2 shows a flow diagram to elucidate the method according to the present invention.

FIG. 2 shows a flow diagram of an exemplary sequence of the method according to the present invention. Following the start of the program, engine control unit 35 checks in a program point 100 whether internal combustion engine 1 is operated in overrun. If this is the case, the program branches to program point 105, otherwise the program is exited.

In program point 105, engine control unit 35 checks whether exhaust-gas recirculation valve 40 is open to a predefined opening degree. In this context, the opening degree of exhaust-gas recirculation valve 40 may therefore be detected, for example, by a measuring means not shown in FIG. 1, such as a potentiometer, and be transmitted to engine control unit 35. If engine control unit 35 determines in program point 105 that exhaust-gas recirculation valve 40 has approximately attained the predefined opening degree, branching to a program point 110 takes place; otherwise, it is branched to a program point 115.

In program point 115, engine control unit 35 controls exhaust-gas recirculation valve 40 for the purpose of adjusting the predefined opening degree. The program subsequently branches to program point 110.

The predefined opening degree may be selected such that, for example, it corresponds to a full opening of exhaust-gas recirculation valve 40. For a diagnosis of the function of first actuating element 20 it is generally sufficient, however, to observe a defined opening degree, in the form of the predefined opening degree of gas-recirculation valve 40, so as to obtain a reliable diagnosis result. Furthermore, exhaust-gas recirculation valve 40 must not be completely closed for such a diagnosis. The wider exhaust-gas recirculation valve 40 is open, the greater the effect of the position of first actuating element 20 on the intake-manifold pressure, and consequently the more reliable the diagnosis of the function of first actuating element 20 with the aid of the intake-manifold pressure. For diagnosing the function of first actuating element 20, the complete opening of exhaust-gas recirculation valve 40 is therefore advantageously selected as the predefined opening degree of exhaust-gas recirculation valve 40. If exhaust-gas recirculation valve 40 is not closed, exhaust-gas recirculation is activated.

In program point 110, engine control unit 35 controls first actuating element 20 in such a way that it is adjusted into its first position for blocking first branch line 200 and for completely releasing first bypass 55. In this case, the entire exhaust gas flows through first bypass 55 and not through heat exchanger 45. Then, branching to a program point 120 is implemented. In program point 120, the intake-manifold pressure is measured by intake-manifold pressure sensor 30, conveyed to engine-control unit 35 and stored, as first intake-manifold pressure ps1, in engine-control unit 35 or in a memory (not shown in FIG. 1) associated with engine-control unit 35. Subsequently, the program branches to a program point 125. In program point 125, engine-control unit 35 controls first actuating element 20 in such a way that it is displaced from the first position into the second position in which it blocks bypass 55 completely and completely releases first branch line 200, so that the entire exhaust gas flows via heat exchanger 45 and not via first bypass 55. Then it is branched to a program point 130.

In program point 130, the intake-manifold pressure is measured by intake-manifold pressure sensor 30, conveyed to engine-control unit 35 and stored, as second intake-manifold pressure ps2, in engine-control unit 35 or in the memory assigned to engine-control unit 35. Subsequently, the program branches to a program point 135.

First intake-manifold pressure ps1 is the intake-manifold pressure in the case that first actuating element 20 is present in its first position, and intake-manifold pressure ps2 is the intake-manifold pressure at which first actuating element 20 is present in its second position. In the case of the second position of first actuating element 20, the entire exhaust gas flows through heat exchanger 45, so that the exhaust-gas counterpressure prevailing at first branch 80 is greater than it would be if first actuating element 20 were present in its first position and blocking first branch line 200 completely. The reason for this is that the heat exchanger constitutes a greater pressure resistivity than first bypass 55. Thus, given an open exhaust-gas recirculation valve 40, the intake-manifold pressure is lower in the case of the first position of first actuating element 20 than it is in the second position of first actuating element 20.

In program point 135, engine-control unit 35 forms the amount of the difference between first intake-manifold pressure ps1 for the first position of first actuating element 20 and second intake-manifold pressure ps2 for the second position of first actuating element 20. This difference is designated Δ in the following and results with respect to $$\Delta = |ps1 - ps2| \qquad (1)$$

Subsequently, the program branches to a program point 140.

In program point 140, engine-control unit 35 checks whether the difference Δ falls below a predefined threshold value. If this is the case, the program branches to a program point 145, otherwise the program branches to program point 150.

In program point 145, engine-control unit 35 detects a fault in the position of first actuating element 20 and initiates an error message, in a combination instrument of the vehicle, for example. In addition or as an alternative, engine-control unit 35 may also take an error measure in program point 145 and, as a last resort, turn off internal combustion engine 1, for example. The program is subsequently exited.

In program point 150, engine-control unit 35 diagnoses a faultless operation of first actuating element 20 and, if appropriate, issues a corresponding control message, to the combination instrument of the vehicle, for example. The program is subsequently exited, too.

The predefined threshold value may be stored, for instance as a function of the rotational speed of combustion engine 75, and thus internal combustion engine 1, in a characteristics map in engine-control unit 35 or in the associated memory. An engine speed sensor at combustion engine 75, which is not shown in FIG. 1, measures the actual rotational speed of combustion engine 75 and conveys it to engine-control unit 35. As a function of the actual rotational speed, engine-control unit 35 is thus able in program point 140 to ascertain from the characteristics map the threshold value associated with this rotational speed and to compare it to difference Δ. This characteristics map constitutes a one-dimensional characteristic curve, for example which predefines an associated threshold value for difference Δ for various rotational speeds. The characteristic curve may be applied on an engine test stand. It takes the fact into account that the exhaust-gas counterpressure depends on the rotational speed of combustion engine 75. The larger the rotational speed, the larger the exhaust-gas counterpressure, and the larger the selected predefined threshold value.

In a defect of first actuating element 20 in which first actuating element 20 in its second position no longer completely closes first bypass 55, comparatively little exhaust gas flows through heat exchanger 45, due to its greater pressure resistivity compared to first bypass 55, so that the exhaust-gas counterpressure at first branch 80 essentially results from the pressure resistivity of first bypass 55. Consequently, first intake-manifold pressure ps1 and second intake-manifold pressure ps2 do not deviate from one another to any substantial degree and the difference Δ will be below the predefined and appropriately applied threshold value, so that the fault of first actuating element 20 may be detected in the described manner.

The predefined threshold value is applied for the various rotational speeds of combustion engine 75 in such a way that it may only be exceeded by difference Δ if first actuating element 20, in its first position, essentially fully closes first branch line 200 and first bypass 55 in its second position.

According to the flow diagram according to FIG. 2, the diagnosis of first actuating element 20 is implemented when internal combustion engine 1 is operated in overrun. Alternatively, it is also possible to implement the diagnosis when internal combustion engine 1 is being accelerated. In this case, more interference effects must be taken into account, which means that the predefined threshold value must be selected slightly lower than in overrun operation at approximately the same rotational speed, so that effects the acceleration has on the intake-manifold pressure may be taken into account. As a rule, the diagnosis of the function of first actuating element 20 can thus not be carried out as precisely as it is in overrun operation.

Alternatively to ascertaining the intake-manifold pressure with the aid of intake-manifold pressure sensor 30, the intake-manifold pressure may also be determined with the aid of an intake-manifold model in the manner known to one skilled in the art, as a function of the fresh-air mass supplied to combustion engine 75 via intake manifold 15 and as a function of the exhaust-gas mass supplied via exhaust-gas recirculation channel 5. The air mass and the exhaust-gas mass may in each case be determined via a mass air-flow sensor in intake manifold 15, for example, or in exhaust-gas recirculation channel 5. It is also possible to use the rotational speed of combustion engine 75 for determining the intake-manifold pressure.

An additional diagnosis of the function of first actuating element 20 may be implemented with the aid of the mentioned potentiometer and/or first temperature sensor 65. While the potentiometer can detect exact position information of first actuating element 20 and provide it to engine-control unit 35, the temperature measurement with the aid of first temperature sensor 65 is an indirect method for checking and monitoring the operability of first actuating element 20. If first actuating element 20 is in its second position, the entire exhaust gas flows via heat exchanger 45 and not via first bypass 55, so that first temperature sensor 65 in first bypass 55 ascertains the ambient temperature, for example. However, if first actuating element 20 is in its first position, the entire exhaust gas flows via first bypass 55 and not via heat exchanger 55, so that first temperature sensor 65 in first bypass 55 ascertains the exhaust-gas temperature, which differs from the ambient temperature. The resulting difference of the temperatures measured by first temperature sensor 65 in first bypass 55 for the first position and the second position of first actuating element 20 may then be evaluated, analogously to the intake-manifold pressure, to diagnose the function of first actuating element 20. If the amount of the temperature difference exceeds a second threshold value, which may also be a function of the rotational speed of combustion engine 75, for example, a fault-free function of first actuating element 20 is diagnosed; otherwise a fault is detected. With the program for monitoring the function of first actuating element 20 via the intake-manifold pressure, described in accordance with the flow diagram of FIG. 2, for example, it is then possible to monitor, alternatively or additionally, a diagnosing of the function of first actuating element 20 by first temperature sensor 65 and/or the potentiometer.

Figure 3:
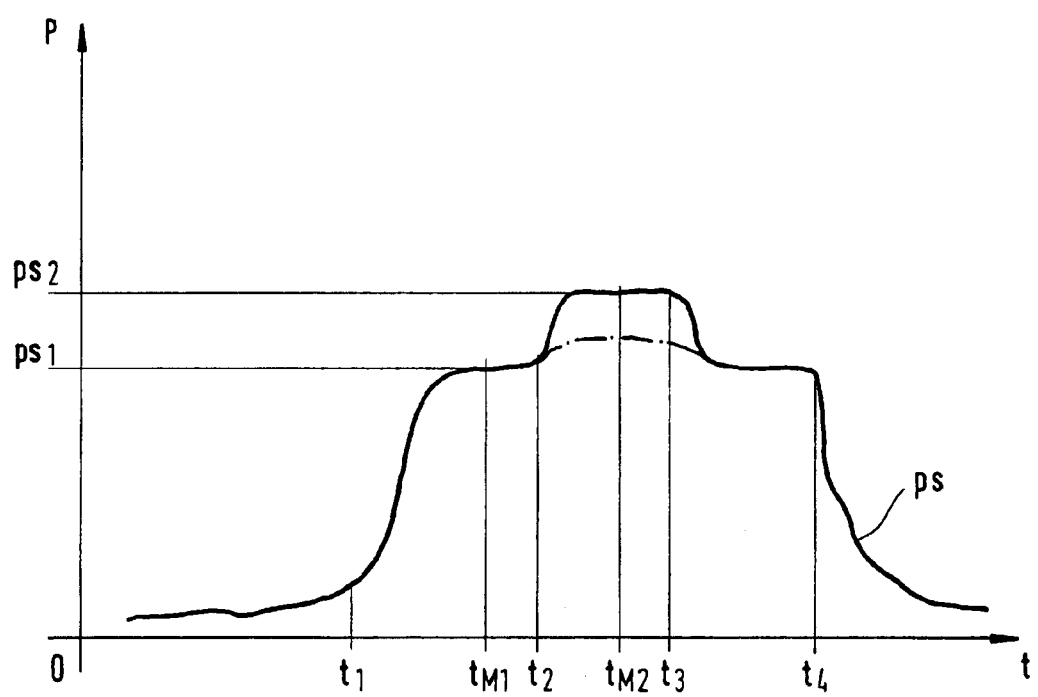
FIG. 3 shows a pressure-time diagram for an exemplary intake-manifold pressure profile for diagnosing the function of at least one actuating element in an exhaust branch of the internal combustion engine.

In FIG. 3, a profile of the intake-manifold pressure ps over time t is shown by way of example in a pressure (p)-time (t) diagram. At a first instant $t_1$, exhaust-gas recirculation valve 40 is completely closed and the retrospective effect of the exhaust-gas counterpressure on intake-manifold pressure ps relatively low as a consequence. At first instant $t_1$, exhaust-gas recirculation valve 40 is opened completely and intake-manifold pressure ps rises considerably due to the exhaust-gas counterpressure now having a retrospective effect on intake manifold 15. First actuating element 20 is in its first position. After the intake-manifold pressure has taken effect following the opening of exhaust-gas recirculation valve 40, intake-manifold pressure sensor 30, at a first instant $t_{M1}$ which follows first measuring instant $t_1$, measures first intake-manifold pressure ps1 and conveys it to engine-control unit 35 for storing. Subsequently, in program point 125, engine-control unit 35 initiates a switchover of first actuating element 20 into the second position at a second instant $t_2$ that follows the first measuring instant $t_{M1}$. Since the entire exhaust gas now flows off via heat exchanger 45, the exhaust-gas counterpressure rises at first branch 80 and thus the intake-manifold pressure as well. After the intake-manifold pressure has once again taken effect, intake-manifold pressure sensor 30 measures second intake-manifold pressure ps2 at second measuring instant $t_{M2}$, which follows second instant $t_2$, and conveys it to engine-control unit 35 for storage. Engine-control unit 35 may then carry out the diagnosis of the function of first actuating element 20 in the described manner according to the flow diagram in FIG. 2. At a third instant $t_3$ subsequent to second measuring instant $t_{M2}$, engine-control unit 35 then initiates the switchover of first actuating element 20 into the first position again, so that the intake-manifold pressure drops again to the first intake-manifold pressure ps1. Subsequently, engine-control unit 35, at a fourth instant $t_4$, which follows third instant $t_3$, initiates the complete closing of exhaust-gas recirculation valve 40, so that the intake-manifold pressure ps subsequently drops again to a value that had been reached prior to first instant $t_1$.

In the profile of intake-manifold pressure ps according to FIG. 3 over time t it is assumed in this example that the displacement of first actuating element 20 from the first position into the second position leads to a significant difference in the intake-manifold pressure. In the case of a defective first actuating element 20, for example, a profile as it is shown by a dot-dash line in FIG. 3 would result for intake-manifold pressure ps between second instant $t_2$ and fourth instant $t_4$, the profile showing no significant pressure difference in the intake-manifold pressure for the first position of first actuating element 20 compared to the second position of first actuating element 20.

Figure 4:
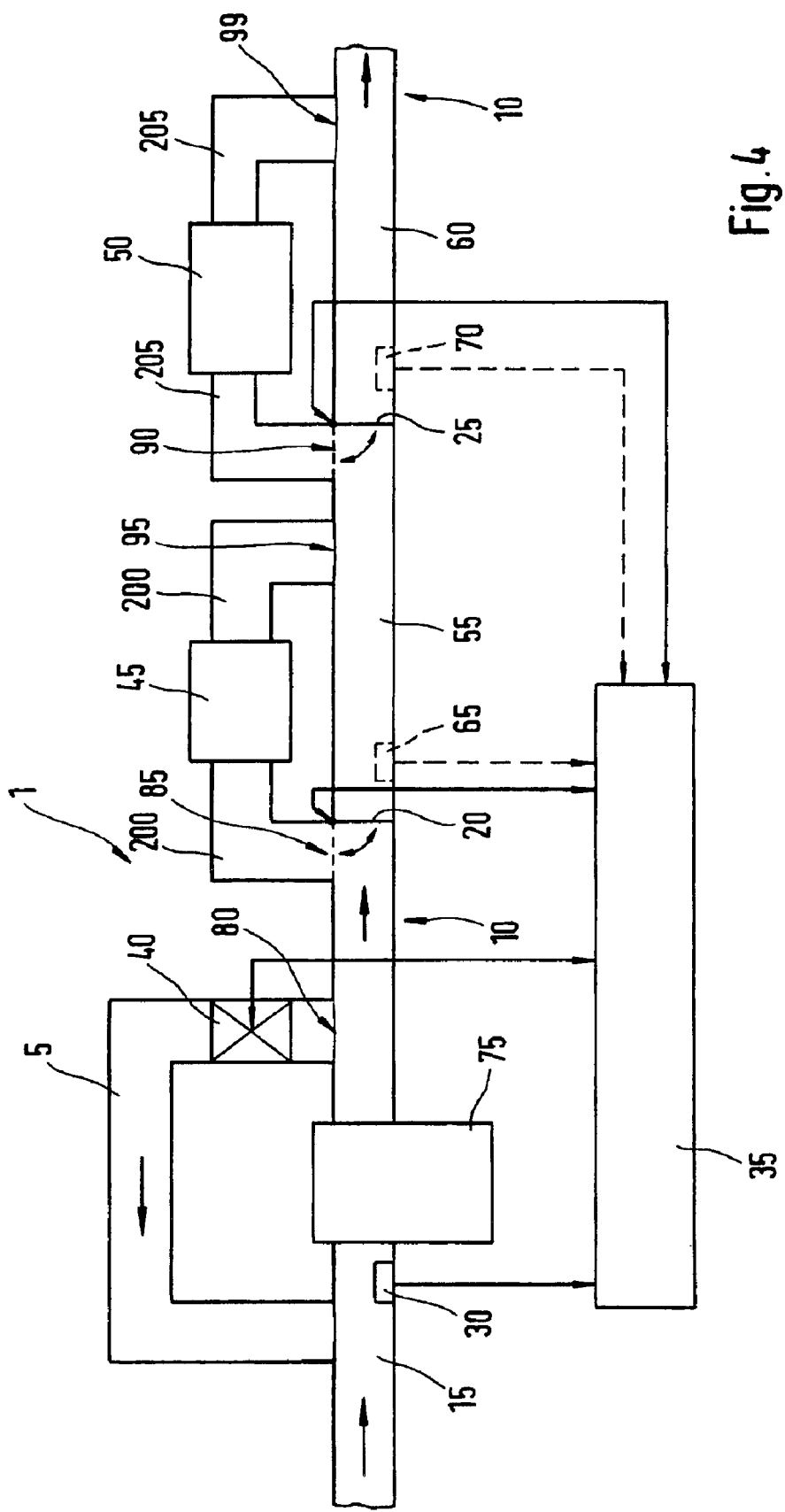
FIG. 4 shows a schematic view of the internal combustion engine configured according to a second specific embodiment.

FIG. 4 schematically shows a second specific embodiment of internal combustion engine 1 according to the present invention. Identical reference numerals denote the same elements as in the first specific embodiment according to FIG. 1. In addition to the first specific embodiment according to FIG. 1, the second specific embodiment according to FIG. 4 provides a third branch 90 downstream from first return branch 95 in the flow direction, via which the exhaust gas may be conveyed to a second pressure resistor 50, which may be embodied as a catalytic converter, such as a NOx catalytic converter, by way of a second branch line 205. Second branch line 205, via a second return branch 99, subsequently ends in exhaust branch 10 again. Second pressure resistor 50, here embodied as catalytic converter by way of example, is bypassed by a second bypass 60 of exhaust branch 10. A second actuating element 25 is provided, which in a first position completely closes second branch line 205 and conveys the entire exhaust gas through second bypass 60. In a second position of second actuating element 25, second bypass 60 is completely blocked and the exhaust gas conveyed in its entirety via the second branch line and catalytic converter 50. In the second specific embodiment according to FIG. 4 as well, it is possible to optionally provide a measuring means, such as a potentiometer, for detecting the setting or the position of second actuating element 25, the measuring means detecting the position of second actuating element 25 and transmitting it to engine-control unit 35. In addition or as an alternative, a second temperature sensor 70 may be provided in second bypass 60, downstream from second actuating element 25 in the flow direction, as indicated in FIG. 4 by the dashed line, which measures the temperature in second bypass 60 and conveys it to engine-control unit 35. Alternatively, second temperature sensor 70 may also be located in second branch line 205 in the region of second actuating element 25.

Second actuating element 25 is likewise controlled by engine-control unit 35 for the purpose of adjusting the first position or the second position of second actuating element 25.

The diagnosis of the function of second actuating element 25 may be implemented in the same manner as the diagnosis of first actuating element 20 according to the flow diagram of FIG. 2. However, it must be ensured here that the position of first actuating element 20 is not modified during the diagnosis of second actuating element 25 and that the position of second actuating element 25 is not modified in the diagnosis of the function of first actuating element 20. Furthermore, for the diagnosis of the function of second actuating element 25, the position of first actuating element 20 is fixedly predefined in an advantageous manner, so that for this position a corresponding threshold value may be applied for the diagnosis of second actuating element 25. Conversely, for the diagnosis of the function of first actuating element 25, a position of second actuating element 20 is fixedly predefined in an advantageous manner, so that for this position a corresponding threshold value may be applied for the diagnosis of first actuating element 20.

The threshold value predefined for the diagnosis of second actuating element 25 may likewise be applied or predefined in the way it is described for the diagnosis of first actuating element 20, as a function of the rotational speed of combustion engine 25.

In a corresponding manner, the function of one or a plurality of additional actuating elements in exhaust branch 10 may be diagnosed as well, which also allow a switchover between a pressure resistor and a bypass in the manner described. Thus, the described diagnosis of the at least one actuating element 20, 25 in exhaust branch 1 is possible without an additional sensory system, solely by using sensory systems already present, for example in the form of intake-manifold pressure sensor 30, so that no additional expenditure for hardware is required.

What is claimed is:

1. A method for operating an internal combustion engine of a motor vehicle, the vehicle including an exhaust-gas recirculation via which exhaust gas is conveyed from an exhaust branch to an intake manifold in an activated state, the vehicle further including at least one actuating element in the exhaust branch, the method comprising:

determining, in at least one operating state of the engine, given an activated exhaust-gas recirculation, (a) a first intake-manifold pressure in a first position of the at least one actuating element in the exhaust branch and (b) a second intake-manifold pressure in a second position of the at least one actuating element in the exhaust branch; and monitoring a function of the at least one actuating element in the exhaust branch as a function of a difference between the first and the second intake-manifold pressures.

2. The method according to claim 1, further comprising:

detecting a malfunction of the at least one actuating element in the exhaust branch when an amount of the difference between the first and the second intake-manifold pressures falls below a predefined threshold value.

3. The method according to claim 2, wherein the predefined threshold value is selected as a function of a rotational speed of the engine.

4. The method according to claim 1, wherein the monitoring of the function of the at least one actuating element is implemented in an overrun operation of the engine.

5. The method according to claim 1, wherein the at least one actuating element includes a plurality of actuating elements, and wherein, in the monitoring of the plurality of actuating elements in the exhaust branch, the function of each one of the actuating elements is monitored and a position of at least one remaining actuating element is kept constant.

6. A device for operating an internal combustion engine of a motor vehicle, the vehicle including an exhaust-gas recirculation via which exhaust gas is conveyed from an exhaust branch to an intake manifold in an activated state, the vehicle further including at least one actuating element in the exhaust branch, the device comprising:

detection means for determining, in at least one operating state of the engine, given an activated exhaust-gas recirculation, (a) a first intake-manifold pressure in a first position of the at least one actuating element in the exhaust branch and (b) a second intake-manifold pressure in a second position of the at least one actuating element in the exhaust branch; and means for monitoring a function of the at least one actuating element in the exhaust branch as a function of a difference between the first and the second intake-manifold pressures.

* * * * *